(12) United States Patent
Wang

(10) Patent No.: US 8,749,901 B2
(45) Date of Patent: Jun. 10, 2014

(54) LENS MODULE AND METHOD FOR ASSEMBLING THE LENS MODULE

(71) Applicant: Hon Hai Precision Industry Co., Ltd., New Taipei (TW)

(72) Inventor: Chien-Chun Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/726,153

(22) Filed: Dec. 23, 2012

(65) Prior Publication Data

US 2013/0258504 A1      Oct. 3, 2013

(30) Foreign Application Priority Data

Mar. 29, 2012   (TW) ............................. 101110941 A

(51) Int. Cl.
*G02B 7/02*     (2006.01)

(52) U.S. Cl.
USPC ............................ 359/819; 359/820; 359/830

(58) Field of Classification Search
USPC .................................. 359/694–704, 811–830
See application file for complete search history.

(56) References Cited

U.S. PATENT DOCUMENTS

| 7,639,435 B2 * | 12/2009 | Chiang | 359/819 |
| 7,916,410 B1 * | 3/2011 | Lin et al. | 359/819 |
| 2010/0214679 A1 * | 8/2010 | Iikawa et al. | 359/825 |

* cited by examiner

*Primary Examiner* — Mohammed Hasan
(74) *Attorney, Agent, or Firm* — Novak Druce Connolly Bove + Quigg LLP

(57) ABSTRACT

A method for assembling a lens module includes the following steps. Firstly, a lens barrel, at least one optical element, a spacer ring, and a fixing ring are provided. The spacer ring includes an annular projection along a circumference of the spacer ring. The fixing ring includes a annular pipe and glue received in the pipe. The film is made of ethylene-vinyl acetate copolymer. Secondly, the at least one optical element and the spacer ring are put into the barrel, with an annular groove defined between the projection and the barrel. Thirdly, the fixing ring is placed in the groove. Fourthly, the fixing ring is heated and the film is melted to let the glue fill the groove. Finally, the glue is cured to fix the spacer ring and the at least one optical element in the barrel.

16 Claims, 8 Drawing Sheets

LENS MODULE AND METHOD FOR ASSEMBLING THE LENS MODULE

BACKGROUND

1. Technical Field

The present disclosure relates to a method for assembling a lens module and a related lens module.

2. Description of Related Art

During a lens module assembly process, glue is required to fix an optical element firmly in a barrel. Small needles are generally employed to inject and dispense the glue because lens module can be quite compact. However, the small needles are easily clogged by the glue, which decreases the efficiency of the assembly process.

Therefore, what is needed is a method for assembling a lens module which can overcome the above mentioned shortcomings.

DETAILED DESCRIPTION

Figure 1:
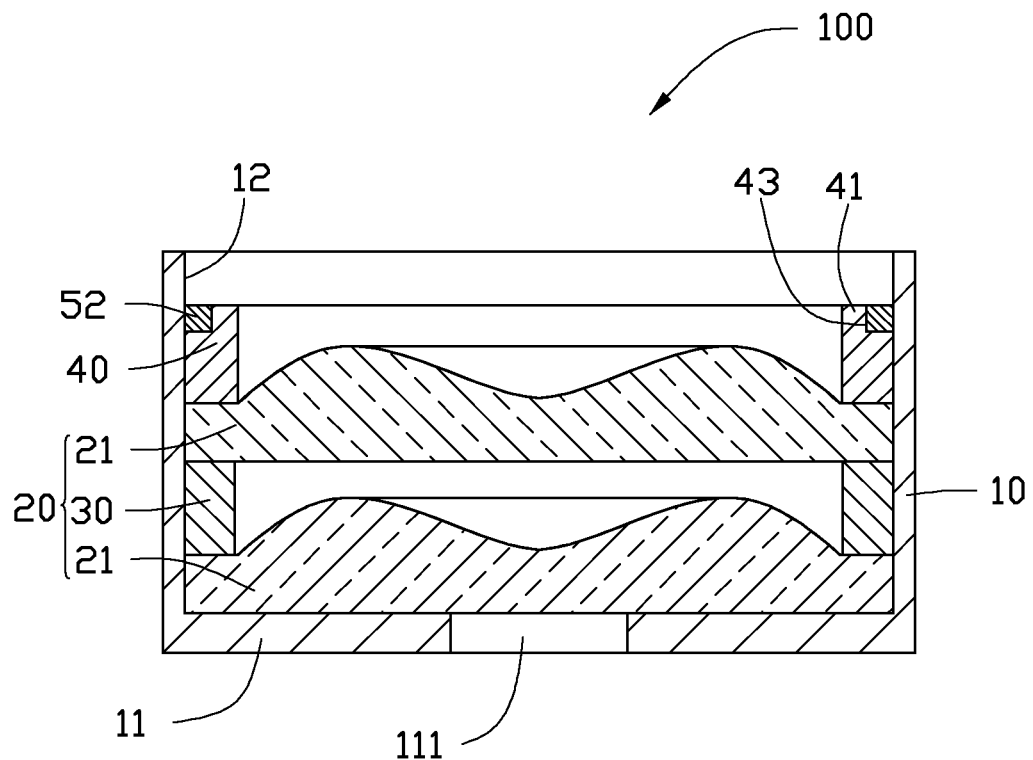
FIG. 1 is a schematic view of a lens module according to a first embodiment.
Figure 2:
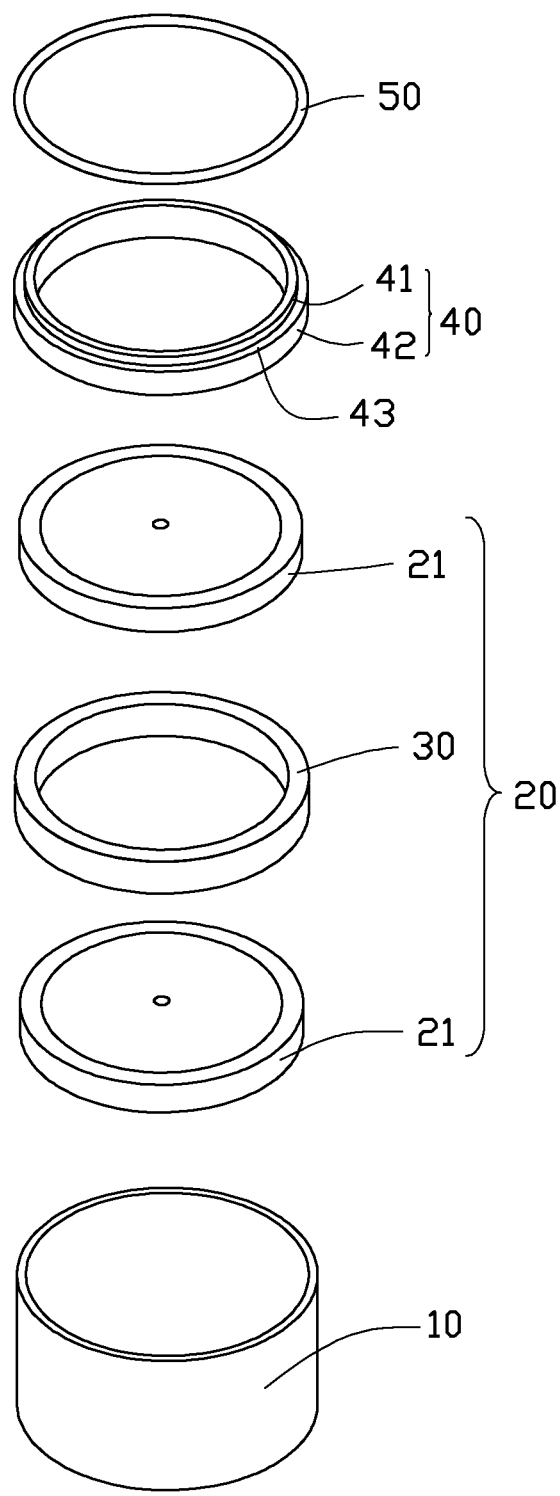
FIGS. 2-5 are schematic views showing successive steps of a method for assembling a lens module according to a second embodiment.

Referring to FIG. 1, a lens module 100 according to a first embodiment is shown. The lens module 100 includes a lens barrel 10, a lens group 20, a spacer ring 40, and a fixing element 52. The lens barrel 10 includes a first end part 11 defining a light through hole 111 and a second end part 12 opposite to the first end part 11. The spacer ring 40 and the lens group 20 are received in the lens barrel 10. The optical axis of the lens module 100 is aligned with a central axis of the light through hole 111. The lens group 20 includes two lenses 21 and an intermediate ring 30. The intermediate ring 30 is sandwiched between the two lenses 21 and is used to protect optical parts of the two lenses 21 from friction damage. The intermediate ring 30 is a hollow circular ring. One of the two lenses 21 touches the first end part 11. The other one of the two lenses 21 touches the spacer ring 40. The spacer ring 40 includes a ring body 42 and an annular protrusion 41 protruding from a first side surface 43 of the ring body 42. The annular projection 41 extends away from the lens group 20. The annular projection 41 and the lens barrel 10 cooperatively form an annular groove 43 therebetween. The annular groove 43 is close to the second end part 12. The fixing element 52 is received in the annular groove 43 and fixes the spacer ring 40 and the lens group 20 in the lens barrel 10. The fixing element 52 can be a heat-curable glue or a light-curable glue.

Referring to FIGS. 2-5, a method for assembling the lens module 100 according to a second embodiment is shown. The method includes steps described as follows.

In step 1, a lens barrel 10, a lens group 20, a spacer ring 40, and a fixing ring 50 are provided. The lens group 20 includes two lenses 21 and an intermediate ring 30 sandwiched between the two lenses 21.

In step 2, the lens group 20 and the spacer ring 40 are sequentially put into the lens barrel 10. The annular projection 41 of the spacer ring 40 faces away from the lens group 20. The annular projection 41 and the lens barrel 10 cooperatively form the annular groove 43 therebetween.

Figure 3:
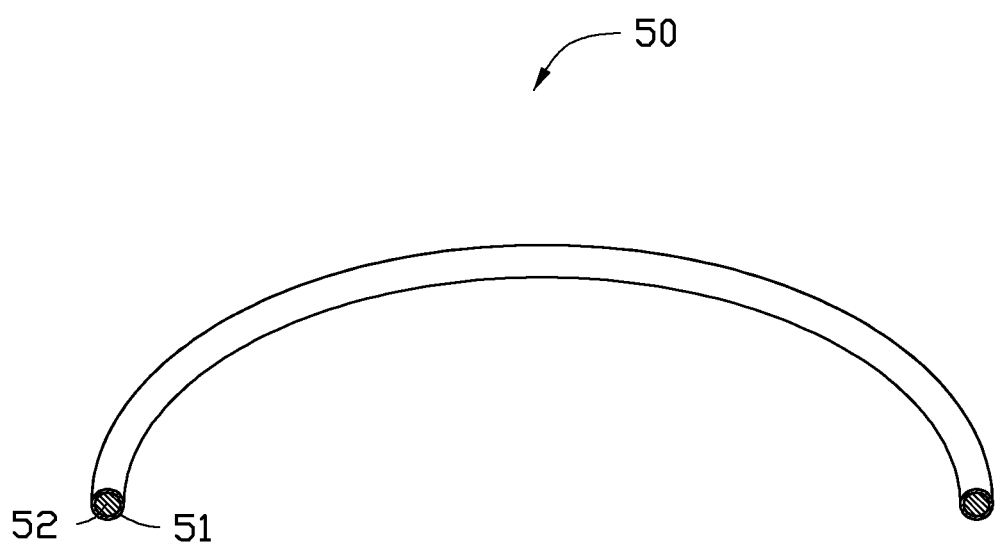
Figure 4:
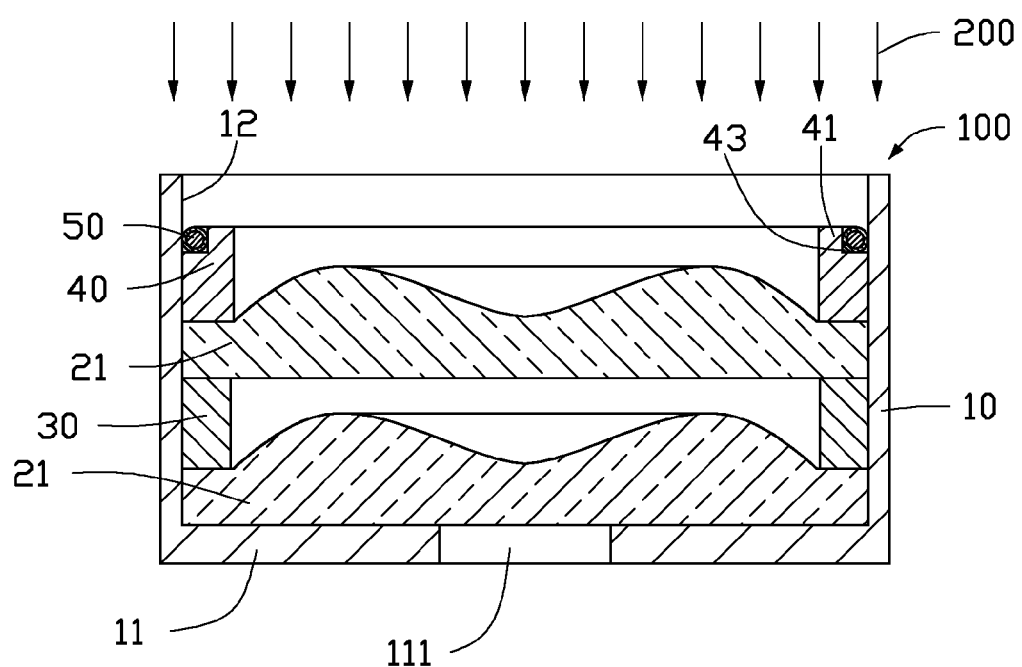
Figure 5:
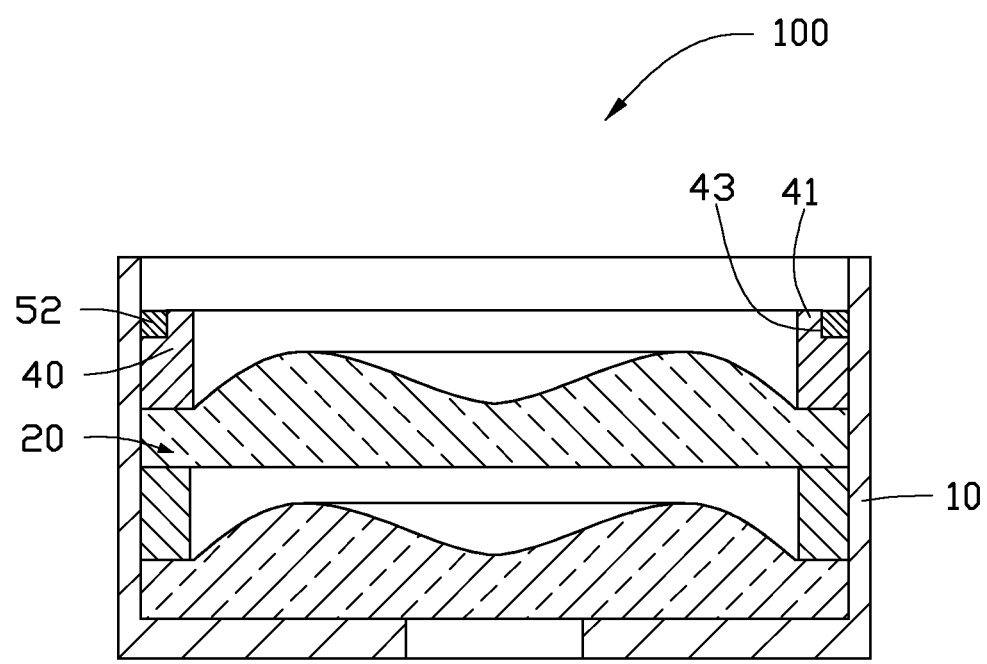

In step 3, the fixing ring 50 is placed in the groove 43. Referring to FIG. 3, the fixing ring 50 includes an annular pipe 51 and glue 52 encapsulated in the pipe 51. In this embodiment, the cross section of the fixing ring 50 is substantially round.

The film 51 is made from ethylene-vinyl acetate copolymer (EVA). The EVA is a new environmentally friendly plastic foam material, the content of acetate ethylene (VA) is in a range from 5% to 40%. The melting point of the EVA is decided by the VA content. When the content of the VA is 28%, the melting point of EVA is 70 degrees Celsius; when the content of the VA is 18%, the melting point of EVA is 80 degrees Celsius. In this embodiment, the content of the VA is 18%. The film 51 is thin and easy to melt.

In step 4, the fixing ring 50 is heated to melt the film 51 such that the glue 52 is released to fill the annular groove 43. In this step, a heating source 200 is provided. The fixing ring 50 is heated using the heating source 200 to a temperature of about 80° C. The film 51 melts and the glue 52 encapsulated in the film 51 flows into the annular groove 43 to fully fill the annular groove 43 and the clearance between the lens barrel 10 and the lens group 20. Once the film 51 has melted, the heating source 200 may be deactivated.

In step 5, the glue 52 in the annular groove 43 is cured. The glue 52 can be a heat-curable glue or an ultraviolet-curable glue. If the glue 52 is a heat-curable glue, a heat source (not shown) is provided to cure the glue 52 at a temperatures of about 80° C. If the glue 52 is an ultraviolet-curable glue, an ultraviolet light source (not shown) is provided to cure the glue 52. The wavelength of the UV light for curing is between about 320 nm to about 400 nm and the curing time is about 15 seconds.

The assembling method simplifies the lens module assembly process using the fixing ring 50 to fix the lens group 20 in the lens barrel 10 and avoids a glue dispensing process.

Figure 6:
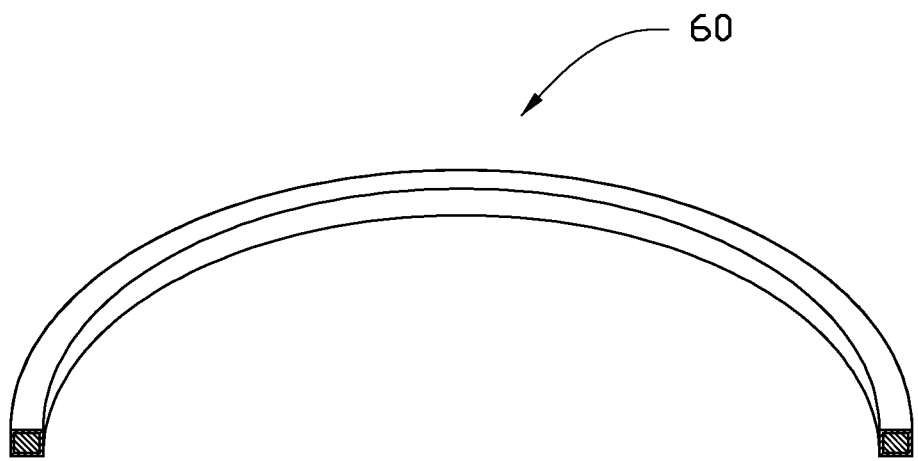
FIG. 6 is a sectional view of a fixing ring according to a third embodiment.

FIG. 6 shows a fixing ring 60 according to a third embodiment. The difference between the fixing ring 60 and the fixing ring 50 in the second embodiment is that the cross section of the fixing ring 60 is substantially square.

Figure 7:
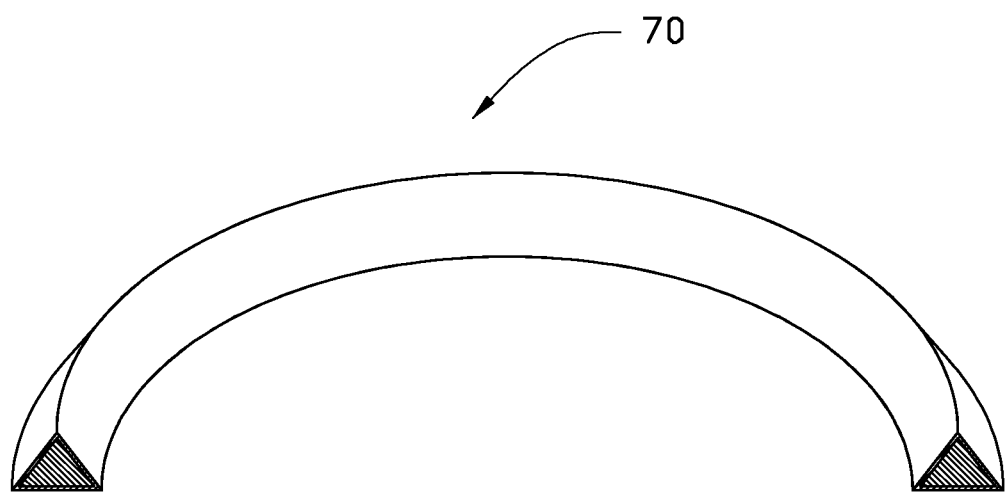
FIG. 7 is a sectional view of a fixing ring according to a fourth embodiment.

FIG. 7 shows a fixing ring 70 according to a fourth embodiment. The difference between the fixing ring 70 and the fixing ring 50 in the second embodiment is that the cross section of the fixing ring 70 is substantially triangular.

Figure 8:
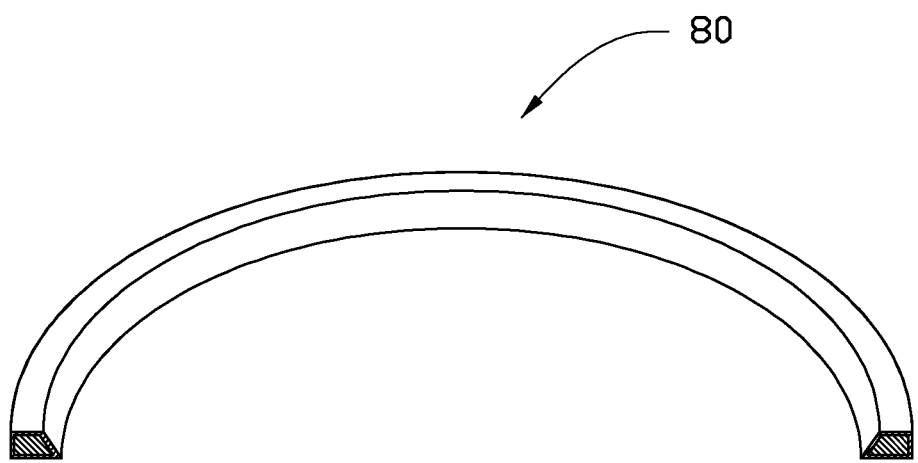
FIG. 8 is a sectional view of a fixing ring according to a fifth embodiment.

FIG. 8 shows a fixing ring 80 according to a fifth embodiment. The difference between the fixing ring 80 and the fixing ring 50 in the second embodiment is that the cross section of the fixing ring 80 is substantially trapezoidal.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A method for assembling a lens module, comprising:
   providing a lens barrel, at least an optical element, a spacer ring and a fixing ring, the spacer ring having a ring body defining a first side surface and an annular protrusion protruding from the first side surface of the ring body, the fixing ring comprising an annular pipe and a glue received in the pipe, the pipe made from poly (ethylene vinyl acetate);

placing the at least one optical element and the spacer ring into the lens barrel, the first side surface facing away from the optical element; the annular protrusion, the first side surface and an inner surface of the lens barrel cooperatively defining an annular groove therebetween;

placing the fixing ring in the annular groove;

heating the fixing ring to melt the pipe such that the glue is released to fill the annular groove; and curing the glue in the annular groove.

2. The method of claim 1, wherein a cross-section of the fixing ring is substantially square.

3. The method of claim 1, wherein a cross-section of the fixing ring is substantially round.

4. The method of claim 1, wherein a cross-section of the fixing ring is substantially triangular.

5. The method of claim 1, wherein a cross-section of the fixing ring is substantially trapezoidal.

6. The method of claim 1, wherein the fixing ring is melted using a heating source.

7. The method of claim 6, wherein the fixed ring is heated at a temperature of about 80° C.

8. The method of claim 1, wherein the glue is heat-curable glue or ultraviolet-curable glue.

9. The method of claim 1, wherein the glue is the ultraviolet curable glue and is cured using an ultraviolet source.

10. The method of claim 9, wherein the glue is cured using ultraviolet light having a wavelength in a range from 320 nanometers (nm) to 400 nm.

11. The method of claim 1, wherein the glue is heat curable glue and is cured using a heating source.

12. The method of claim 1, wherein the content of acetate ethylene (VA) in the ethylene-vinyl acetate copolymer is in a range from 5% to 40%.

13. The method of claim 1, wherein the content of acetate ethylene (VA) in the ethylene-vinyl acetate copolymer is 18%.

14. The method of claim 1, wherein the content of acetate ethylene (VA) in the ethylene-vinyl acetate copolymer is 28%.

15. A lens module, comprising:

a lens barrel;

at least one optical element received in the lens barrel;

a spacer ring received in the lens barrel, the spacer ring having a ring-shaped body defining a first side surface and an annular protrusion formed on the first side surface of the ring-shaped body, the first side surface facing away from the at least one optical element; the annular protrusion, the first side surface, and an inner surface of the lens barrel cooperatively defining an annular groove therebetween; and a glue received and cured in the annular groove.

16. The lens module of claim 15, wherein the glue is heat-curable glue or Ultraviolet light-curable glue.

\* \* \* \* \*